No. 816,889. PATENTED APR. 3, 1906.
A. VANDER STICHELEN.
FLEXIBLE TIRE.
APPLICATION FILED DEC. 16, 1904.
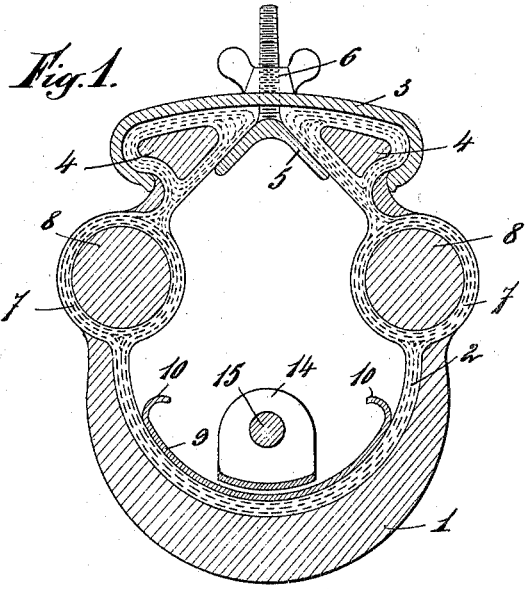
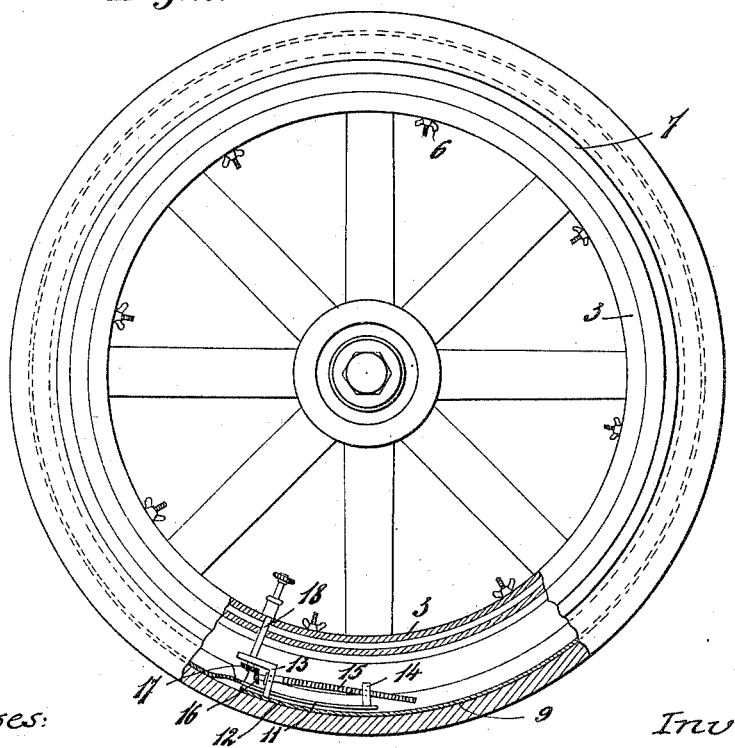

UNITED STATES PATENT OFFICE.

ALBERT VANDER STICHELEN, OF GAND, BELGIUM.

FLEXIBLE TIRE.

No. 816,889.  Specification of Letters Patent.  Patented April 3, 1906.

Application filed December 16, 1904. Serial No. 237,118.

*To all whom it may concern:*

Be it known that I, ALBERT VANDER STICHELEN, a subject of the King of Belgium, residing at 47 Rue du Patin, Gand, in the Kingdom of Belgium, have invented new and useful Improvements in Flexible Tires, of which the following is a specification.

The object of this invention is to provide an improved tire for the wheels of automobiles, carriages, bicycles, and generally for vehicles of all kinds.

It is designed to provide a tire without an air-chamber, but which shall possess all the qualities from the point of view of elasticity and resiliency of an ordinary pneumatic tire without being exposed, however, to the inconveniences inherent in this kind of tire—such, for example, as bursts and punctures.

The tire which is the object of the invention is characterized, essentially, by an envelop or cover of rubber and canvas of the same kind as those used with ordinary pneumatic tires, but provided on each side with two cushions of soft rubber capable of giving springiness. Inside this envelop or cover is placed a ring or circle of steel, aluminium, or other suitable material, of which the diameter can be increased or diminished by means of appropriate mechanism acting on the extremities of the ring or circle and capable of being actuated from the exterior of the felly of the wheel in such a manner as to put the metallic circle or ring in the interior of the tire under compression and also to give to it the necessary rigidity.

The invention will be fully described with reference to the accompanying drawings.

Figure 1 is a transverse section of a tire constructed according to the invention; Fig. 2, an elevation of wheel provided with a tire constructed in accordance with the invention, the latter being partly in section to show the device for regulating the compression of the metal ring inside the cover.

As shown in the drawings, the envelop or cover 1 is formed of rubber and of one or more layers of canvas 2. This envelop is secured in any suitable manner to the felly 3—for instance, by means of angle-pieces 4, fixed to the felly and maintained in position by grips or clamps 5, secured by screws and nuts 6. The layers of canvas 2, combined with the rubber 1, form the sides of the tire and at nearly its mid-height two pockets are formed which receive internally a cushion or ring of soft or flexible rubber 8.

In the interior of the tire before it is fixed on the felly of the wheel a ring or circle 9 of steel, aluminium, or other suitable material, is placed. This ring or circle is preferably made in the form shown in Fig. 1, to press against the internal periphery of the envelop or cover, and its edges 10 are slightly turned over to augment the rigidity of the ring or circle 9 and to form a sort of groove, permitting the two extremities 11 and 12 of the ring to slide one on the other, Fig. 2. The extremities 11 and 12 of the ring or circle 9 are united by a suitable device capable of putting the ring or circle under compression—that is to say, capable of increasing or diminishing at will the diameter of the ring or circle—by means acting on its extremities, governed from the outside of the tire. Fig. 2 shows a suitable arrangement for this purpose. As shown in this figure, one of the extremities 12 of the ring or circle 9 carries a small support or bracket 13, through which the other extremity 11 passes in a suitable groove or slot. This extremity 11 is also provided with a similar bracket or projection 14, which forms a nut. A screw 15 passes through the two supports or brackets 13 and 14 and carries at its extremity exterior to the first-described support or bracket a small pinion or bevel-wheel 16, gearing with a second pinion 17, mounted on a rod or spindle 18, carried in an arm or projection from the said support or bracket 13 and extending to the outside of the felly 3 of the wheel in a manner somewhat similar to the valves of ordinary pneumatic tires.

It will be seen from the above that if the rod or spindle 18, carrying the small pinion or bevel-wheel, is rotated by means of a key, a thumb-screw, or any other suitable means the screw 15, carried by the supports or brackets 13 and 14 on the extremities of the internal circle or ring 9, will be rotated by means of the two small pinions or bevel-wheels and will cause the said supports or brackets 13 and 14 to be drawn together, causing a corresponding increase in the diameter of the ring or circle 9. A rotation of the rod or spindle 18 in the opposite direction will, on the contrary, cause a decrease in the diameter of the ring or circle. It is possible thus by a suitable rotation of the said rod or spindle 18 to produce any increase desired in the compression of the circle or ring 9 and to give to the cover or envelop the rigidity necessary according to the weight which is to be supported by the wheel. The object of the putting under compression of the ring or circle 9 being to increase or decrease more or less the diameter of the envelop or cover, an elongation of the rubber rings or cushions 8 on each side of the tire results therefrom, the parts of the canvas 7 inclosing these cushions stretching and approaching each other in such a manner as to permit of the increase of the diameter of the envelop or cover.

The wheel thus constructed is in some sort suspended in an elastic manner in the center of the system formed by the envelop or cover in its internal circle or ring 9. When it is rotated, the shocks received on its lower part transmit themselves to the ring or circle 9, which tends to displace itself concentrically with regard to the axis or to the felly of the wheel. This movement is nearly deadened throughout the circumference of the wheel by the soft-rubber cushions or rings 8 at either side of the tire, which stretch slightly in the upper part of the wheel.

A tire is thus obtained which possesses all the advantages of an actual pneumatic tire without, however, being exposed to the bursts, punctures, and deflations which often take place with such tires.

What I claim is—

1. A non-inflated tire comprising a cover, a lining for said cover, resilient or spring means for placing said cover under tension, said lining having annular pockets therein and elastically-extensible material contained in said pockets and arranged to be put under tension by said resilient or spring means.

2. A non-inflated tire comprising a cover, a lining of textile material strengthening the same, a metallic ring placed inside the cover, means for expanding said ring, whereby the tire is placed under tension, said lining being provided with pockets on each side of the cover, a pair of flexible india-rubber rings inclosed in said pockets, the said flexible rings being expanded by said metallic ring to give resiliency to the tire, substantially as described.

In testimony whereof I have signed my name to this specification in the presence of two subscribing witnesses.

ALBERT VANDER STICHELEN.

Witnesses:
GEORGE BEDE,
GREGORY PHELAN.